United States Patent [19]

Chrobaczek et al.

[11] Patent Number: 5,039,642
[45] Date of Patent: Aug. 13, 1991

[54] STABLE, FINELY-DISPERSED, AQUEOUS SINGLE-COMPONENT SILICONE CATALYSTS, PROCESS FOR THEIR PREPARATION AND THEIR USE

[75] Inventors: Harald Chrobaczek; Josef Lechlmair, both of Augsburg, Fed. Rep. of Germany

[73] Assignee: Ciba-Geigy Corporation, Ardsley, N.Y.

[21] Appl. No.: 415,019

[22] Filed: Sep. 29, 1989

[30] Foreign Application Priority Data

Oct. 3, 1988 [DE] Fed. Rep. of Germany ....... 3833572

[51] Int. Cl.$^5$ ............................................. B01J 31/12
[52] U.S. Cl. ..................................... 502/155; 502/156; 502/158; 502/164; 502/170; 252/8.8; 428/389; 428/391; 8/115.6
[58] Field of Search ............... 502/155, 156, 158, 164, 502/170

[56] References Cited

U.S. PATENT DOCUMENTS

| | | | |
|---|---|---|---|
| 3,320,197 | 5/1967 | Enders et al. | 260/29.2 |
| 4,369,231 | 1/1983 | West et al. | 428/421 |
| 4,559,319 | 12/1985 | Kurita et al. | 502/152 |
| 4,824,890 | 4/1989 | Glover | 524/253 |

FOREIGN PATENT DOCUMENTS 1444551 2/1971 Fed. Rep. of Germany .

OTHER PUBLICATIONS

Derwent Abstract 74-39040v, Abstract of JP-A-48092453.

*Primary Examiner*—Patrick P. Garvin
*Assistant Examiner*—Brent M. Peebles
*Attorney, Agent, or Firm*—George R. Dohmann; Edward McC. Roberts

[57] ABSTRACT

The present patent application relates to stable, finely-dispersed, aqueous single-component silicone catalysts which have been obtained by combining a silicone dispersion which is free to essentially free of lower monohydric alcohols and has been prepared in a conventional manner in the presence of long-chain liquid alcohols having 6 to 18 carbon atoms and with the use of known epoxyamine prepolymers as emulsifiers with a separately prepared, conventional nonionic or cationic dispersion of organometallic compounds.

In addition, a process for the preparation of this emulsion and the use thereof are described.

The catalysts according to the invention are distinguished by not having a flashpoint or having a flashpoint above 65° C. and nevertheless having excellent stability, in particular mechanical stability.

12 Claims, No Drawings

STABLE, FINELY-DISPERSED, AQUEOUS SINGLE-COMPONENT SILICONE CATALYSTS, PROCESS FOR THEIR PREPARATION AND THEIR USE

The present invention relates to stable, finely-dispersed aqueous single-component silicone catalysts, a process for their preparation and their use for the finishing of fiber materials.

It is known from German Patent 1,444,551 to use watersoluble, neutral to acid reaction products of aliphatic or aromatic compounds which contain epoxy groups with aliphatic, cycloaliphatic or heterocyclic polyamines for the emulsification of, inter alia, diorganopolysiloxanes. Furthermore, it is known also to incorporate organometallic compounds in dispersions of this type and to use the dispersions thus obtained as hardeners for, in particular, organohydridopolysiloxanes (see Leaflet ®PHOBOTON BC dated August 1982).

The known dispersions have the disadvantage that they can only be prepared in the presence of large amounts of lower alcohols which have 1 to 3 carbon atoms, since only then are they sufficiently stable and subjectable to mechanical stress. However, the presence of alcohol represents a safety risk for these products.

Therefore, the object was to eliminate or substantially eliminate this alcohol without adverse effect on the advantageous properties of the dispersions, in particular the finely-dispersed form and thus the stability and subjectability to mechanical stress thereof.

Surprisingly, this object has been achieved by preparing the silicone dispersion separately in the presence of a long-chain, liquid alcohol and then combining it with the separately prepared dispersion of the organometallic compound.

The present invention accordingly relates to stable, finely-dispersed, aqueous single-component silicone catalysts, such as explained in more detail in claims 1 to 5. A process for the preparation of these catalysts is also claimed, as well as the use thereof in combination with conventional silicone dispersions for the finishing of fiber materials.

The principle of the preparation of the silicone dispersions (dispersion 1) is disclosed in German Patent 1,444,551 mentioned above, and one skilled in the art will have no difficulty in following this procedure, which today is of course carried out in the absence of chlorinated hydrocarbons. According to the invention - and this is the decisive criterion of the present subject-matter the preparation of these dispersions is in this case carried out in the presence of a long-chain liquid alcohol having 6 to 18 carbon atoms or of mixtures of such alcohols. Examples of suitable alcohols of this type are not only saturated but also unsaturated, straightchain and also branched alcohols, of which in particular 2-ethylhexanol, n-octanol, isotridecyl alcohol and oleyl alcohol may be mentioned. Saturated alcohols having 8 to 13 carbon atoms are particularly preferred. The amounts of long-chain liquid alcohol are such that, when dispersion (1) is prepared, 1 to 10, preferably 2 to 8, and most preferably 2.5 to 7% by weight thereof are contained in the ready-to-use single-component silicone catalyst.

The use of these long-chain liquid alcohols for the preparation of the dispersion (1) enable to distill off about completely the lower alcohol having 1 to 3 carbon atoms, necessary for the preparation of the epoxyamine prepolymer solution used as emulsifier as soon as the neutralization is completed, so that a dispersion (1) is obtained which is poor or free of lower alcohols.

The silicones used for the preparation of the dispersion (1), especially polydialkylsiloxanes, are known to one skilled in the art and need not to be described specifically. In general, due to economical reasons, polydimethylsiloxanes of varying viscosity are used, although α, ω-dihydroxypolydialkyl-, preferably - dimethylsiloxanes, are also suitable - though to a lesser degree - for the preparation of the single-component silicone catalysts.

Dispersion (2), that is the dispersion of the organometallic compound, is prepared in the usual manner by using nonionic or even cationic emulsifiers.

They can usually be prepared by adding to an aqueous solution of the emulsifier the organometallic compound or a mixture of organometallic compounds with rapid stirring and then preparing the stable emulsion by homogenization under pressure and at slightly elevated temperature and adjusting an acidic pH either before or even afterwards by the addition of acids, in particular acetic acid. The organometallic compounds used for the preparation of dispersion (2) are known. In general, dialkyltin dicarboxylates, such as, for example, dibutyltin dilaurate and/or dioctyltin dilaurate, metal soaps, such as zinc octoate or zinc stearate, but also titanium or zirconium carboxylates, such as, for example, stearyltitanate or stearylzirconate, are used for this purpose. Other organometallic compounds are, however, also known to one skilled in the art.

The emulsifiers used are also known to one skilled in the art. Without pretention of completeness, it may be mentioned that suitable nonionic emulsifiers are ethylene oxide reaction products of higher fatty acids, fatty alcohols, fatty acid amides and fatty acid amines, it also being possible for the latter to be utilized in the form of their salts with lower carboxylic acids, such as acetic, formic or glycolic acid, or mineral acids, such as hydrochloric acid or sulfuric acid. Examples of nonionic emulsifiers of this type are: ethoxylated coconut fatty amine having 5 to 15 ethylene oxide units, ethoxylated stearyl or oleyl amine having 5 to 30 ethylene oxide units or the acetates or chlorides of these compounds, ethoxylated (N-stearyl)- or (N-hexadecyl)trimethylenediamine having 10 ethylene oxide units, ethoxylated stearamide having 12 ethylene oxide units, ethoxylated oleomonoethanolamide having 4 ethylene oxide units, ethoxylated cetyl, stearyl, isotridecyl and oleyl alcohol having on average 10 to 15 ethylene oxide units, 2, 6, 8-trimethyl-4-nonylpolyoxyethylene and lauric, palmitic, stearic, behenic and ricinoleic acid having 10 to 30 ethylene oxide units. As the examples show, the hydrocarbon radicals can be saturated or unsaturated and have in particular 12 to 20 carbon atoms and are ethoxylated with on average preferably 5 to 15 ethylene oxide units.

Suitable cationic emulsifiers are in particular the quaternary ammonium compounds. Examples of these compounds are: cetyl- or laurylbenzyldimethylammonium chloride, but also polyoxyethylene (10 to 15)-$C_{12}$ to $C_{18}$ -alkylmethylammonium chlorides.

To prepare the ready-to-use single-component silicone catalysts, the separately prepared dispersions (1) and (2) are combined in such a manner that 1 to 50, preferably 15 to 35, parts of dispersion (1) are used per part of dispersion (2). On the one hand, the ratio depends on the concentration of dispersions (1) and (2), which can be varied within wide limits. Thus, dispersion (1) in general contains about 10 to 45% by weight of polydialkylsiloxane and dispersion (2) usually contains 8 to 30% by weight of organometallic compound. Now, depending on whether dispersions (1) and/or (2) are employed in higher or lower concentrations, it is necessary to vary the ratio. On the other hand, the ratio depends on the intended use of the catalysts so that finally single-component silicone catalysts are obtained which contain about 0.15 to 10, preferably 0.4 to 1.5% by weight of organometallic compound. In this manner, single-component silicone catalysts are obtained which, in addition to water, usual agents for adjustment of the pH, resistance to frost and the like (sum =100%) contain the following components: 5 to 45% by weight, preferably 20 to 40% by weight, of silicone, in particular polydialkyl-, especially polydimethylsiloxanes, which are understood to mean also α, ω-dihydroxypolydialkylsiloxanes, 1 to 10% by weight, preferably 2 to 8% by weight, of long-chain liquid alcohols having 6 to 18 carbon atoms, 0.5 to 16, preferably 3 to 13% by weight of epoxyamine prepolymer, 0.01 to 3% by weight, preferably 0.01 to 0.5% by weight, of conventional nonionic or cationic emulsifiers, 0.15 to 10% by weight, preferably 0.4 to 1.5% by weight, of organometallic compound and 0 to 1.5% by weight, preferably below 0.8% by weight, of lower monohydric alcohols having 1 to 3 carbon atoms.

The single-component silicone catalysts according to the invention are distinguished by special mechanical stability, of which in particular the excellent resistance to shaking may be mentioned, which means that these dispersions remain stable even under extreme practical conditions. The reason for this stability is the excellent finely-dispersed state of the emulsified components, and it was surprising that it was possible to prepare stable silicone catalysts by using long-chain liquid alcohols having 6 to 18 carbon atoms and by emulsifying dispersions (1) and (2) separately, despite the at least substantial absence of the lower monohydric alcohols. Supposedly, this advantage is additionally favored by the separate emulsification and thus the separate droplet formation. The advantage of the catalyst according to the invention resides in particular in the fact that they no longer have a flashpoint or their flashpoint is above 65° C. and thus allow simpler storage, since the safety risk caused until now by the lower alcohol could surprisingly be eliminated.

The single-component silicone catalysts obtained as well as the known formulations are employed in amounts of 5 to 50, preferably 10 to 40, g/l (in the pad-dyeing process) as hardener in particular for polyorganohydridosiloxanes, it being quite possible also to use other known textile aids for the application. Examples are crease-resist agents, stiffening agents and also antistatics and the corresponding catalysts, a particularly good water-repellent effect being obtained by additionally using a further catalyst for the H-polysiloxane in small amounts.

The finishing liquors are prepared in a simple and known manner by mixing the single-component silicone catalysts with the conventional silicone emulsions, in particular polyhydridoorganosiloxane emulsions and further textile finishing agents. The catalysts according to the invention can be used by all known finishing methods, of which in particular the pad-dyeing process and the exhaust method are suitable. For the latter, which is of particular interest for wool and wool blend articles, the catalysts according to the invention are in general used in amounts of 0.5 to 5, preferably 1 to 2.5,%, relative to the weight of the material to be finished. The novel catalysts can, however, also be used in the same manner as is known for coatings.

Exactly as in the known processes, fiber materials of any kind can be treated by means of the present catalysts in combination with the further textile aids mentioned. Suitable fiber materials are in particular textiles, of which in turn those textiles are particularly suitable which consist of cellulose fibers or contain at least in part cellulose fibers. Suitable additional fibers, apart from cellulose, are not only synthetic fibers, such as polyester, polyamide or polyacrylonitrile fibers, but also wool. However, it goes without saying that the hydrophobization carried out by using the catalysts according to the invention can also be utilized for the treatment of pure synthetic fiber and wool fiber materials.

The invention is illustrated in more details by the following examples in which parts and percentages are by weight.

Example 1

Preparation of dispersion (1)

420 g of an acetic acid solution of an epoxyamine prepolymer (see below) are mixed with 30 g of propylene glycol, 175 g of water and 15 g of 60% strength acetic acid, and then 30 g of isotridecyl alcohol and 250 g of a commercial available polydimethylsiloxane (viscosity at 20° C. 100 mPa.s) are mixed by means of a turbine, and the mixture is homogenized in a high-pressure homogenizer at 300 bar and 30° C. for 45 minutes with stirring.

The abovementioned acetic acid solution of the epoxyamine prepolymer is prepared by mixing 80 g of a glycidyl ether of 2,2-bis(4-hydroxyphenyl)propane (0.43% of epoxy groups) with 31.5 g of hexamethylenediamine and 235.6 g of isopropyl alcohol, heating the mixture to 40 to 50° C. for 45 minutes with stirring and under a reflux condenser and subsequently stopping the reaction by addition of 60% strength acetic acid (about 26 g) and 510 g of water and simultaneously adjusting the pH to a value of about 5. A water/alcohol mixture is then distilled off under reduced pressure at 30° to 40° C. so that only about 2% of isopropyl alcohol are left in the final product which contains about 25% of epoxyamine prepolymer.

Preparation of dispersion (2)

185.8 g of dioctyltin dilaurate are added, by means of a turbine, to the solution of 10.5 g of an isotridecylethoxylate (isotridecyl alcohol having on average 10 ethylene oxide units per mole) and 7.9 g of an ethoxylated coconut methylammonium chloride (on average 12 ethylene oxide units per mole) in 746.5 g of water, 46.3 g of propylene glycol and 3 g of acetic acid, and the mixture is homogenized in a high-pressure homogenizer at 300 bar and 35° C. for 45 minutes.

Preparation of the single-component silicone catalyst

The one-component silicone catalyst is prepared by mixing dispersion (1) and dispersion (2) in a ratio of 24:1 (=catalyst A).

This gives a product which has a turbidity coefficient of 15 (in 1000-fold dilution) as measured by the Lange turbidimeter (from Dr. B. Lange GmbH, Berlin) and, after spectroscopic measurement by photon correlation, a particle size of less than 250 nm.

Catalyst B

For comparison, catalyst B is prepared in the same manner as described above, except that dispersion (1) is prepared in the absence of isotridecyl alcohol using a correspondingly higher amount of water (turbidity coefficient 48).

Catalyst C

For comparison, a catalyst C is prepared as described above for catalyst B in such a manner that the emulsification of the organometallic compound takes place together with the silicone but in the absence of the nonionic emulsifiers mentioned (turbidity coefficient 54).

Catalyst D

As catalyst C, except that 90 g of isopropanol and the correspondingly reduced amount of water are used in the preparation of dispersion (1).

To test the mechanical stability under practical conditions, finishing liquors are prepared as follows:

15 g/l of catalysts A to D
20 g/l of a commercial nonionic 40% strength polymethylhydridosiloxane dispersion (H-siloxane) having a viscosity of 30 mPa.s at 20° C.)
20 g/l of a cellulose crosslinking agent based on glyoxal (50% dimethyloldihydroxyethyleneurea etherified with methanol and about 5% of neutral salt) and 6 ml/l of a commercial metal catalyst (about 30% strength aqueous zinc chloride solution of a pH of about 1).

100 ml of these liquors are subjected to mechanical stress by shaking them at a frequency of 180 vibrations per minute and an amplitude of 10 cm for 1 hour and then allowing them to stand at room temperature for 24 hours. The visual rating of the liquors gives the following picture:

| Liquor | Rating | Flashpoint |
|---|---|---|
| containing catalyst A (according to the invention) | finishing liquor shows excellent flow along the vessel wall without any separation of the substances present | >65° C. |
| containing catalyst B (comparison) | finishing liquor shows nonuniform flow along the vessel wall and appreciable separation (oil) of the substances present | >65° C. |
| containing catalyst C (comparison) | finishing liquor shows nonuniform flow along the vessel wall and appreciable separation (oil) of the substances present | >65° C. |
| containing catalyst D (prior art) | similar to catalyst A | 35° C. |

Finishing Example

If a polyester/cotton overcoat poplin (67/33 of about 300 g m²) is padded (liquor pick up about 65%) by means of the finishing liquor prepared using catalyst A, then dried at 110° C. for 10 minutes and cured at 150° C. for 5 minutes, a water absorption of 10% and a very good water-repellent effect (5/5/4) is obtained in accordance with DIN 53 888.

Example 2

The preparation of the single-component silicone catalyst A according to Example 1 is repeated, except that the dispersion (1) is prepared by using 15 g (A), 60 g (B), and 90 g (C) of isotridecyl alcohol.

The measurement of the turbidity coefficient by means of the Lange turbidimeter gives the values 24, 17, and 31 (measured in 1000-fold dilution) for catalysts A, B and C thus prepared.

Example 3

Example 1, catalyst A, is repeated, using the same amount of 2-ethylhexanol (catalyst A), n-octanol (catalyst B), a 1:1 mixture of oleyl/cetyl alcohol (catalyst C) and, for comparison, myristyl alcohol (catalyst D), and the catalysts obtained show the following turbidity coefficient as measured by means of the Lange turbidimeter in 1000-fold dilution and the following viscosity:

| Catalyst | Turbidity coefficient | Viscosity at 20° C. in mPa.s |
|---|---|---|
| (A) according | 12 | 52 |
| (B) to the | 11 | 100 |
| (C) invention | 18 | 135 |
| (D) (comparison) | 79 | 640 |

The values unanimously show the improved quality of the catalysts according to the invention.

Example 4

Preparation of dispersion (1)

300 g of a weakly acetic acid solution of an epoxyamine prepolymer (see below) are mixed with 325 g of water and 15 g of 60% strength acetic acid, 45 g of isotridecyl alcohol and 300 g of a commercial polydimethylsiloxane (viscosity at 20° C. 500 mPa.s) are then mixed in by means of a turbine, and the mixture is then homogenized in a high-pressure homogenizer at 300 bar and 30° C. with stirring for 45 minutes.

The abovementioned acetic acid solution of the epoxyamine prepolymer is prepared according to Example 4, 2nd paragraph of German Patent 1,444,551, except that the methanol is then distilled off under a water pump vacuum at 30 to 40° C., to give an approximately 25% strength epoxyamine prepolymer solution which contains only about 1% of residual methanol.

Preparation of dispersion (2)

43 g of 60% strength acetic acid and 38 g of stearylamine ethoxylate (10 mol of ethylene oxide per mole of stearylamine) are stirred into 403 g of water, 150 g of dibutyltin dilaurate are then added, and the mixture is homogenized under a nitrogen atmosphere in a high-pressure homogenizer at 30° C. for 45 minutes. Finally, another 350 g of water of 60° C. are run in with stirring.

Preparation of the single-component silicone catalyst

The single-component silicone catalyst is prepared by mixing dispersion (1) and dispersion (2) in a ratio of 10:1 (A), 16:1 (B) and 40:1 (C) with one another. This gives catalysts in finely-particulate form which have high mechanical stability under application conditions.

For treatment of a cotton fabric (about 180 g/m²), a finishing liquor is prepared from 15 g/l of catalysts A to C described above, 25 g/l of a commercial nonionic 35% strength polymethylhydridosiloxane dispersion, 20 g/l of a commercial cellulose crosslinking agent (containing dimethyloldihydroxyethyleneurea etherified with methanol and pentamethylolmelamine in a ratio of 12:1 and about 3% of neutral salt; solids content about 63%) and 6 ml/l of the metal catalyst mentioned in Example 1, the fabric is padded (liquor pick-up about 63%) then dried at 110° C. for about 8 minutes and heated at 155° C. for 4 minutes to effect curing. This gives highly water-repellent materials.

The example can be repeated without hesitation, using a metal soap, for example zinc 2-ethylhexanoate, to prepare dispersion (2). However, in this case it is advantageous to carry out the reaction in the presence of a known solubilizer.

Example 5

Preparation of dispersion (1)

The preparation of dispersion (1) is carried out as described in Example 1.

Preparation of dispersion (2)

97 g of sodium stearate are added to 844 g of water by means of a turbine. 33 g of 65% strength aqueous zinc chloride solution and then 26 g of an isotridecylethoxylate having 10 ethylene oxide units are added to the mixture. The predispersion is emulsified in a highpressure homogenizer at 300 bar and 30° C. for 45 minutes.

Preparation of the single-component silicone catalyst

The single-component silicone catalyst is prepared by mixing dispersions (1) and (2) in a ratio of 3:1 with one another.

This also gives a finely-dispersed catalyst which has high mechanical stability under application conditions.

What we claim is:

1. A stable, finely, dispersed, aqueous, single-component silicone catalyst which comprises:
   a) a long-chain liquid alcohol having 6 to 18 carbon atoms,
   b) an epoxyamine prepolymer,
   c) an organometallic compound selected from the group consisting of organic tin, titanium and zirconium compounds,
   d) a nonionic or cationic emulsifier suitable to disperse said organometallic compound (c) in water, and
   e) a silicone,
   said catalyst being an aqueous dispersion which contains less than 1.5 percent by weight of monohydric alcohols having 1 to 3 carbon atoms.

2. A catalyst of claim 1 which is substantially free of monohydric alcohols having 1 to 3 carbon atoms.

3. A catalyst as claimed in claim 1, wherein the long-chain liquid alcohol is present in amounts of 1 to 10% by weight, relative to the single-component silicone catalyst.

4. A catalyst as claimed in claim 1, wherein the long-chain liquid alcohol is selected from saturated and unsaturated, straight-chain and branched alcohols having 8 to 18 carbon atoms or mixtures thereof.

5. A catalyst of claim 1 which comprises:
   a) 1 to 10% by weight of long-chain liquid alcohols having 6 to 18 carbon atoms,
   b) 0.5 to 16% by weight of an epoxamine prepolymer,
   c) 0.15 to 10% by weight of an organometallic compound selected from the group consisting of organic tin, titanium and zirconium compounds,
   d) 0.01 to 3% by weight of a nonionic or cationic emulsifier suitable for dispersing said organometallic compound (c) in water, and
   e) 5 to 45% by weight of a polydialkylsiloxane.

6. A catalyst of claim 5 which further comprises agents for adjusting the pH and resistance to front.

7. A process for the preparation of a single-component silicone catalyst as claimed in claim 1, which comprises
   a) preparing a silicone dispersion (1) in the presence of a long-chain liquid alcohol having 6 to 18 carbon atoms utilizing on epoxyamine prepolymer as emulsifier, and
   b) mixing dispersion (1) with a separately prepared nonionic or cationic dispersion (2) of an organometallic compound selected from the group consisting of organic tin, titanium and zirconium compounds.

8. The process as claimed in claim 7 wherein the content of lower monohydric alcohol having 1 to 3 carbon atoms during the preparation of dispersion (1) is such that 0 to 1.5 percent by weight of the alcohol are contained in the read-to-use single-component silicone catalyst.

9. The process as claimed in claim 7, wherein the content of long-chain liquid alcohol having 6 to 18 carbon atoms of dispersion (1) is such that 1 to 10% by weight thereof is contained in the read-to-use single-component silicone catalyst.

10. The process as claimed in claim 7, wherein the long-chain liquid alcohol of dispersion. (1) used is selected from saturated and unsaturated, straight-chain and branched chain alcohols having 8 to 18 carbon atoms, or mixtures thereof.

11. The process as claimed in claim 7, wherein a dispersion (1) which comprises 10 to 45% by weight of polydialkylsiloxane is mixed with a dispersion (2) which comprises 8 to 30% by weight of an organo-metallic compound in a weight ratio of 1:1 to 50:1.

12. A catalyst of claim 1 which contains less than 0.8 percent by weight of monohydric alcohols having 1 to 3 carbon atoms.

* * * * *